United States Patent
Mason (10) Patent No.: US 7,978,482 B2
(45) Date of Patent: Jul. 12, 2011

(54) MODULAR HIGH-POWER FUSE CARRIER

(75) Inventor: Anthony S. Mason, Kitchener (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 503 days.

(21) Appl. No.: 12/191,742

(22) Filed: Aug. 14, 2008

(65) Prior Publication Data

US 2010/0039789 A1   Feb. 18, 2010

(51) Int. Cl.
 *H01H 85/04* (2006.01)
(52) U.S. Cl. ......... 361/833; 361/837; 361/824; 361/823
(58) Field of Classification Search .................. 361/823, 361/824, 833, 834, 835, 837
See application file for complete search history.

(56) References Cited

U.S. PATENT DOCUMENTS

| | | | | |
|---|---|---|---|---|
| 5,767,761 A | * | 6/1998 | Muramatsu et al. | 337/197 |
| 6,650,222 B2 | * | 11/2003 | Darr et al. | 337/187 |
| 7,619,902 B2 | * | 11/2009 | Buchbender et al. | 361/833 |

* cited by examiner

*Primary Examiner* — Dameon E Levi
(74) *Attorney, Agent, or Firm* — Boyle Fredrickson LLP; Alexander R. Kuszewski; John M. Miller (57) ABSTRACT

A modular fuse carrier provides an insulating housing of standard form factor incorporating adapter bus bars having multiple mounting points for different fuse brackets at different separations. The adapter bus bars may be attached to connectors and/or bus bars in fixed configurations to allow standardization and pre-manufacture of electrical assemblies that remain amenable to a wide variety of different fuse types and capacities.

20 Claims, 6 Drawing Sheets

MODULAR HIGH-POWER FUSE CARRIER

STATEMENT REGARDING FEDERALLY SPONSORED RESEARCH

--

CROSS-REFERENCE TO RELATED APPLICATIONS

--

BACKGROUND OF THE INVENTION

The present invention relates to high-power electrical systems and, in particular, to an adapter for high-power electrical fuses used in such systems.

High-power electrical fuses handling hundred of amperes at kilovoltages come in a variety of sizes and configurations including ANSI, DIN and British Standard types. These fuse types have different form factors, including different lengths, diameters, and mounting styles depending on both the type and power capacity required, meaning that fuse types and capacities are generally not interchangeable within an installation. While the different fuse types provide overlapping ranges of electrical functions, a customer will typically require a particular fuse type for reasons of standardization within a facility, availability, or electrical capacity requirements.

Fuses are typically used in conjunction with other common electrical elements, for example, electrical contactors, disconnect switches, and the like and assembled in standard configurations. Ideally such standard configurations could be pre-manufactured to avoid costly field assembly. Pre-manufacture of standard configurations can also provide for improved construction including, for example, the use of pre-formed bus bars instead of point-to-point wiring and the incorporation of the components into a standardized drawer assembly permitting the assembly to be readily withdrawn from an equipment cabinet for servicing (for example, for inspection or replacement of the fuses or contactor contacts).

Unfortunately, in order to allow the customer freedom in the choice of fuse type, a variety of different standard assemblies must be pre-manufactured or the installation of the fuses left to the field assembly by the customer. These choices defeat the purpose of pre-manufacture.

SUMMARY OF THE INVENTION

The present invention provides a fuse carrier that converts a variety of different fuse types and sizes into a standard element that may be readily integrated in pre-wired or pre-manufactured assemblies. Generally, the invention provides for a rectangular housing that is readily integrated into an equipment drawer and which includes a range of mounting points that allows a variety of different fuse types and capacities to be held within the housing in a standard volume. By wiring the housing into place, the end user may, with relatively little effort and with no rewiring, freely select among a variety of different fuses and even change among different types and capacities after installation.

Specifically then, the present invention provides a modular fuse carrier having an electrically insulating housing providing a generally rectangular base having upstanding sidewalls and end walls defining, together with the base, a housing volume accessible through an open face opposite the base and having interior divider walls parallel to the sidewalls. The housing holds a set of six adapter bus bars mounted to the base and arranged in three rows separated by the divider walls and arranged along axes between end walls in two columns arranged along axes between sidewalls, the adapter bus bars electrically separated with individual adapter bus bars of each row positioned adjacent to opposite end walls of the housing. Outward, exposed surfaces of corresponding pairs of the adapter bus bars of each row extend along the row by an amount sufficient for the pairs to be spanned by a range of electrical cartridge fuses for voltages between 2.42 and 7.2 kV having different lengths corresponding to different current thresholds. Each adapter bus bar provides multiple mounting points corresponding to each of different electrical cartridge fuses of the range. The adapter bus bars of one column have connections adjacent to an end wall to power connectors extending through an end wall, and adapter bus bars of the other column have connections each to one of a set of three bus bars extending through the housing to an external connection point.

The current threshold range of fuses may be at least 100 amps to 800 amps and the mounting points may provide for the attachment of each of DIN-type, ANSI-type, and British Standard type fuse brackets.

It is thus one object of at least one embodiment of the invention to provide a fuse carrier module that may be pre-assembled into power units using preformed bus bar type conductors and yet accommodating a wide range of fuse types and capacities.

The adapter bus bars may be plates and the mounting points may be internally threaded holes open at the surface of the plates.

It is thus an object of at least one embodiment of the invention to provide a structure allowing maximum flexibility in fuse attachment and the ability to pre-populate multiple mounting points at low cost overhead.

The mounting points may receive fuse brackets selected from the group consisting of single fuse L-brackets, double fuse L-brackets, triple fuse L-brackets, and spring clips.

It is thus an object of at least one embodiment of the invention to permit both ANSI and DIN type fuses as well as parallel assemblies of ANSI and British Standard type fuses.

The three bus bars may extend to points proximate to an outside of one side wall for attachment to a contactor having a base wall coplanar with the base of the modular fuse carrier.

It is thus an object of at least one embodiment of the invention to provide an integrated connection system suitable for close integration with a standard contactor.

The module may further include a set of insulating barrier plates sized to fit between the rows and the end walls in lieu of or augmenting the divider walls, and may further include retaining elements releasably retaining the insulating barrier plates for use with ganged fuse configurations. The end walls may provide supports for four insulating barrier plates between each row and between a top and bottom row and the corresponding sidewall.

It is thus an object of at least one embodiment of the invention to maximize airflow and fuse accessibility when ganged fuses are not required.

The insulating barrier plates may provide central apertures allowing airflow through the fuses at the center of the fuses while providing barriers at electrically conductive portions of the fuses, and the sidewalls and divider walls may have corresponding apertures aligned with air vents passing through the base extending along the columns.

Thus it is an object of at least one embodiment of the invention to provide for a modular housing while retaining good airflow qualities that would be expected in non-modular construction where the fuses are mounted to a simple base plate or a custom fuse block.

The power connectors may be oriented to mate along axes parallel to and aligned with the rows.

It is thus an object of at least one embodiment of the invention to provide a modular fuse adapter that can be put on a rack and pulled from equipment for service using axially releasable connectors while providing access to the fuses perpendicular to the axis.

The housing may provide symmetrical mounting points on an end wall closest to the second column about a plane bisecting the end wall and parallel to the base.

It is thus an object of at least one embodiment of the invention to permit installation in a left or right hand orientation.

The end wall may include integrally molded insulating tubes receiving power connectors attached to adapter bus bars of the first column.

It is thus an object of at least one embodiment of the invention to provide for protective shrouding around the connectors as part of the housing limiting the need for separate shielding measures.

The adapter bus bars may be held by bolts received by threaded inserts in the insulating base.

It is thus an object of at least one embodiment of the invention to provide a simple method of providing multiple terminations within an insulating plastic housing.

The power connectors may be selected from the group consisting of tulip-style, bullet-style, and finger-style connectors.

It is thus another object of at least one embodiment of the invention to provide substantial flexibility in connector style.

These particular objects and advantages may apply to only some embodiments falling within the claims and thus do not define the scope of the invention.

DETAILED DESCRIPTION OF THE PREFERRED EMBODIMENT

Figure 1:
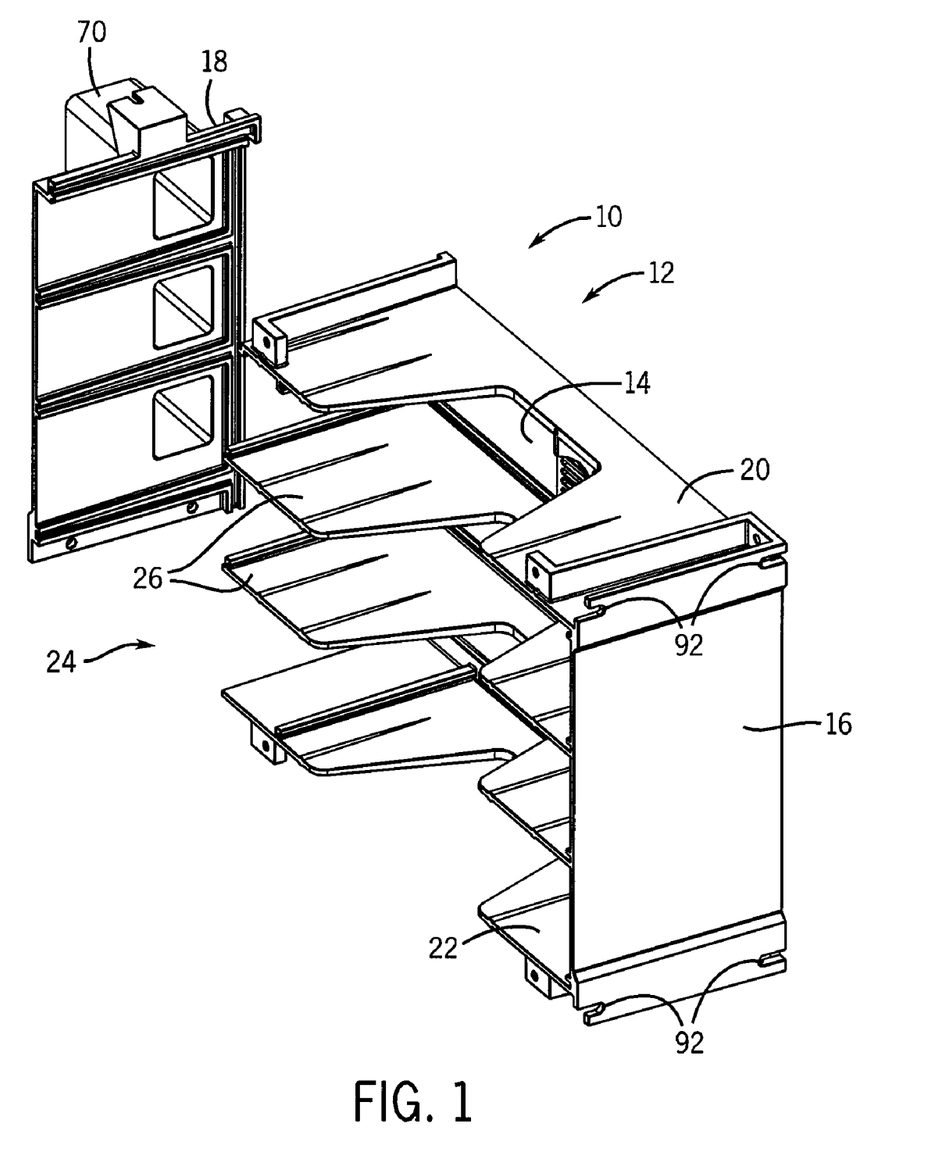
FIG. 1 is an exploded perspective view of the housing of the present invention from a front side showing connector shrouds formed in an end wall of the housing.

Referring now to FIG. 1, a modular fuse carrier 10 of the present invention provides for an electrically insulating, generally rectangular housing 12 having a substantially planar and rectangular base 14 surrounded by four upstanding and opposed walls including end walls 16 and 18 and sidewalls 20 and 22. The walls 16, 18, 20 and 22 form a generally rectangular frame defining an interior volume of the modular fuse carrier 10 open from a front face 24.

Figure 2:
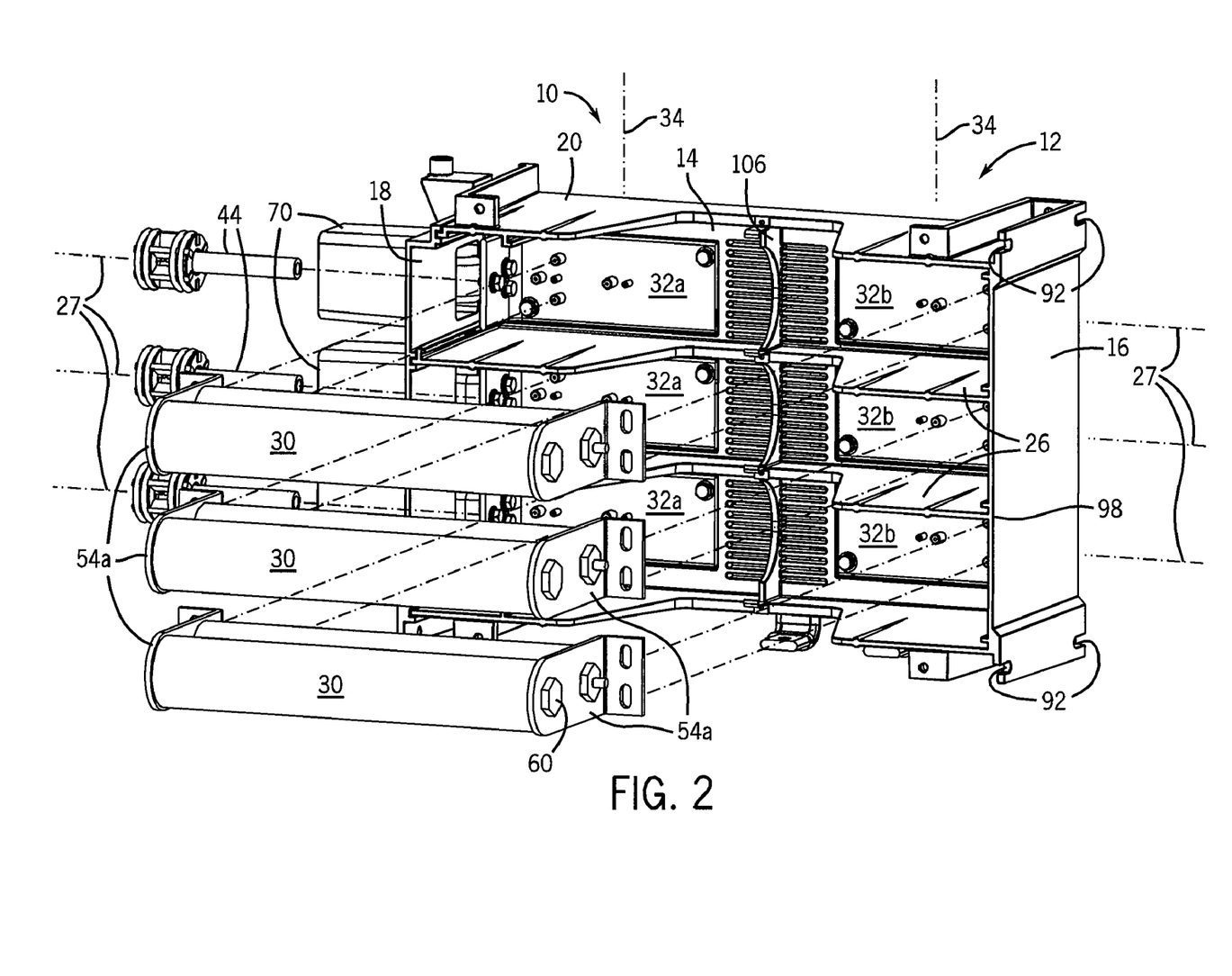
FIG. 2 is an exploded view similar to that of FIG. 1 showing ANSI-type fuses and their associated mounting brackets.

Referring also to FIG. 2, a set of two divider walls 26 extending from the base 14 generally parallel to the sidewalls 20 and 22 divide the interior volume into three rows along row axes 27 extending between the end walls 16 and 18. Each of these rows may accept one or more fuses 30. Although ANSI-type fuses 30 are shown, as will be described in more detail below, the present invention may accommodate any of the standard fuse configurations of DIN-type, ANSI-type fuse, and British Standard type mounts having ratings in the range of 2.4-2.7 kV and in the range of 100 to 400 amps and preferably 10 to 800 amps.

For this purpose, each row provides two conductive adapter bus bars 32a and 32b positioned at opposite ends of each row near walls 18 and 16 respectfully. Adapter bus bars 32a are thus positioned in a first column along a column axis 34 near wall 18 while adapter bus bars 32b are positioned in a second column along a column axis 34 near wall 16.

Figure 3:
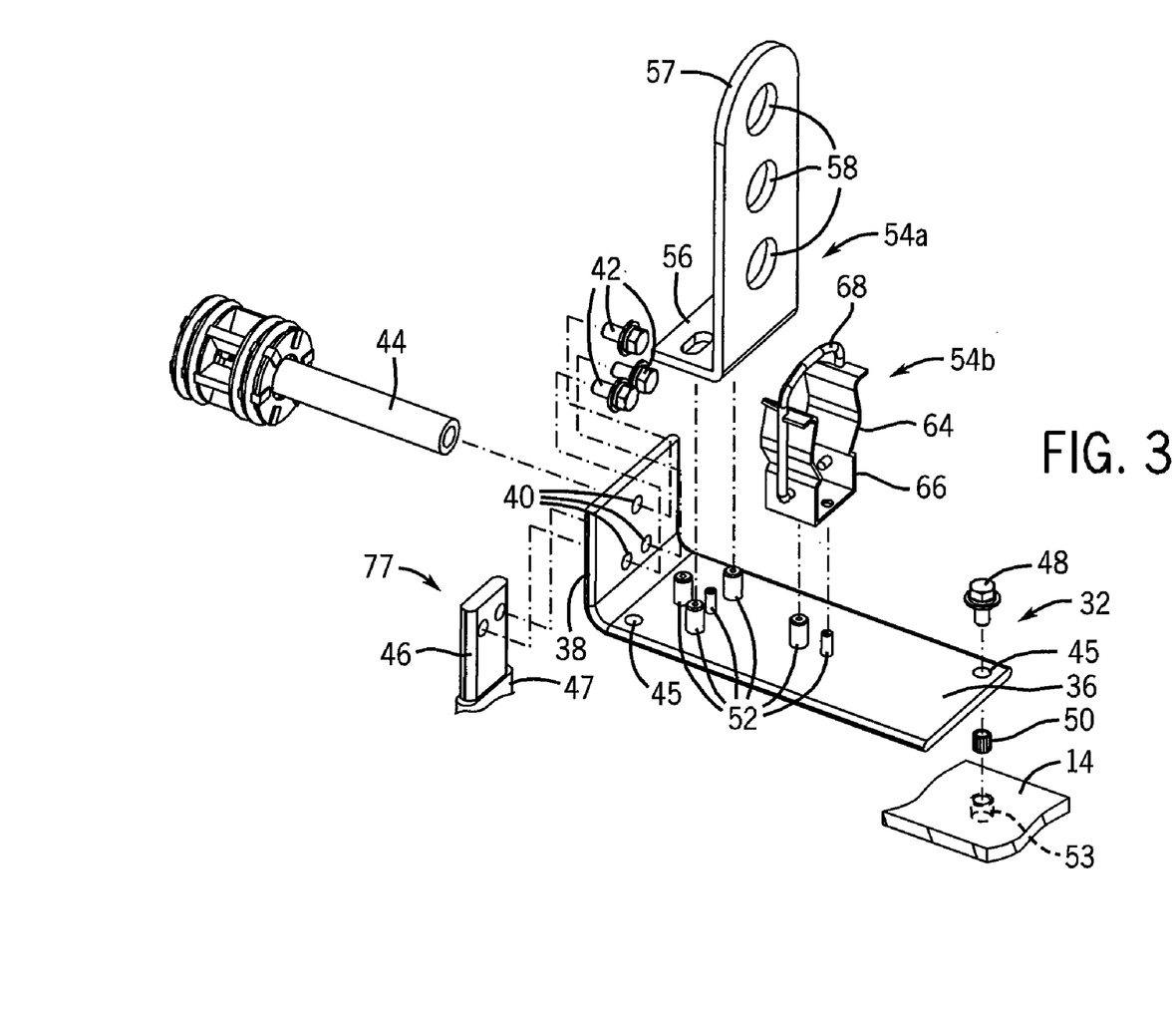
FIG. 3 is a detailed, exploded view of an adapter bus bar of the present invention showing different styles of fuse brackets received at different mounting points.

As shown in FIG. 3, the adapter bus bars 32 include a base plate 36 held adjacent and parallel to the base 14 of the housing 12 and an outwardly extending flange 38 perpendicular thereto. The adapter bus bars 32a and 32b may be manufactured to be substantially identical and simply given different orientations depending on whether they are placed in the first or second column. In either, flange 38 is placed adjacent to a respective wall 18 or 16 and includes mounting holes 40 that may receive bolts 42 that may be used to attach the flange 38 to the shaft of an electrical power connector 44 (when in the first column) or the end of a bus bar 46 (when in the second column).

Referring still to FIG. 3, the base plate 36 includes mounting holes 45 that are used to attached the adapter bus bar 32 to the base 14 of the housing 12 by bolts 48 passing through the holes 45 into threaded inserts 50 held in insulated bores 53, the latter molded into the base 14. The upper surface of the base plate 36 also includes multiple mounting points 52, in one embodiment, providing upwardly exposed threaded bores for receiving machine screws holding mounting brackets 54a or 54b. The threaded bores of the mounting points 52 may be tapped holes directly in the base plate 36 or may be inserts such as well-known "PEMM studs" press fit or riveted to the base plate 36. Alternatively, multiple adapter bus bars may be provided with different sets of holes placed at different mounting points on the surface and/or different PEMM studs.

Mounting bracket 54a provides an L-bracket having a bottom flange 56 that may attach to the mounting points 52 to provide electrical connection to the adapter bus bar 32 and an upwardly extending portion 57 having one to three in-line holes 58 aligned with the row axes 27 that may receive bolts 60 used to attach the ends of ANSI-type or British Standard-type fuses 30 thereto with the long dimension of the fuses 30 also extending along the axes 27. The bracket 54a may be attached at a single set of mounting points 52 on the adapter bus bars 32 closest to an end wall 18 or 16 and thus a pair of brackets 54a accept fuses of a single standard fixed length along the row. On the other hand, different brackets 54a having different numbers of holes 58 may accommodate different numbers of parallel fuses 30 as ganged in a column along the extent of the upwardly extending portion 57.

Figure 4:
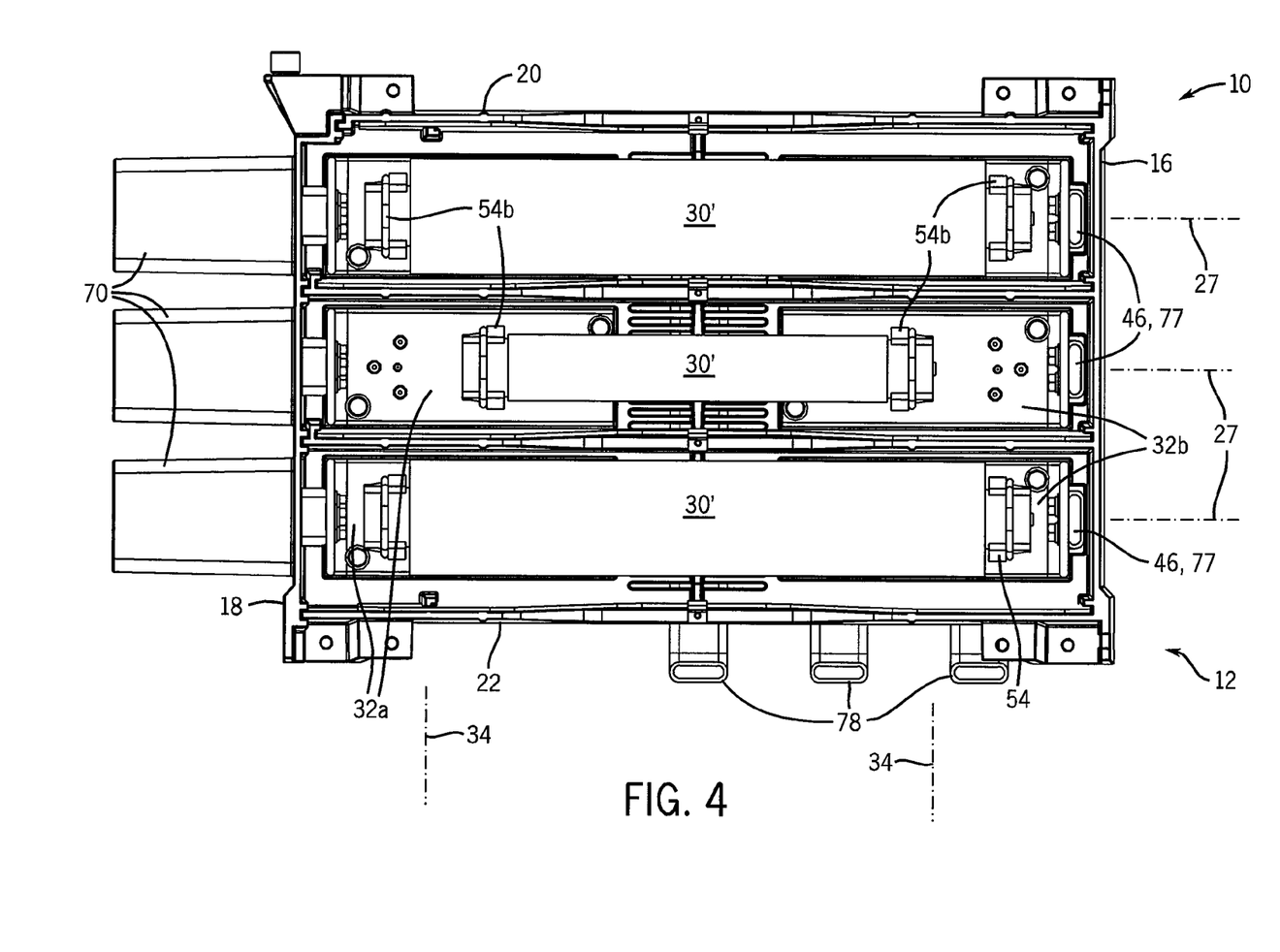
FIG. 4 is a front elevational view of the housing of the present invention showing two sizes of DIN-type fuses.

Referring still to FIG. 3 and FIG. 4, alternatively the mounting bracket 54b may be used for attachment of DIN-type fuses to the adapter bus bar 32. This mounting bracket 54b provides a spring clip element 64 for receiving a conductive ferule on the ends of the fuses 30', the spring clip element 64 being attached to a base 66 that may be received by mounting points 52 in two different locations reflecting the two different lengths of DIN-type fuses 30'. The mounting bracket 54b includes a retaining clip 68 allowing the fuse 30' to be locked in position.

In this way, the mounting conventions of DIN-type, ANSI-type fuse, and British Standard-type fuses may all be accommodated through the use of different mounting brackets 54a and 54b while different fuse capacities can be accommodated through movement of the mounting brackets' 54 two different mounting points 52 to accommodate fuses 30' of different length or through the use of L-brackets 54a allowing ganging of different numbers of fuses 30. By providing simple mounting points 52 in the form of threaded holes, the adapter bus bars 32 may be pre-populated with mounting points 52 at relatively low expense to a customer who only wants one type of fuse 30.

The modular fuse carrier 10 of the present invention may be shipped with a variety of different mounting brackets or mounting brackets may be selected with the understanding they may be replaced at a later date by simple removal of bolts.

Referring now to FIGS. 1, 2, 4, and 6, end wall 18 may include integrally molded rectangular tube shrouds 70 surrounding the connectors 44 when the connectors 44 are attached to adapter bus bars 32a as described above. As so attached, the connectors 44 extend axially along the axes 27 to receive a mating connector 86 along the axes 27. In this way, the entire housing 12 may be plugged in or unplugged by motion along the axes 27. A variety of different connector types may be used, for example, well known tulip-style, bullet-style, and finger-style connectors.

Figure 5:
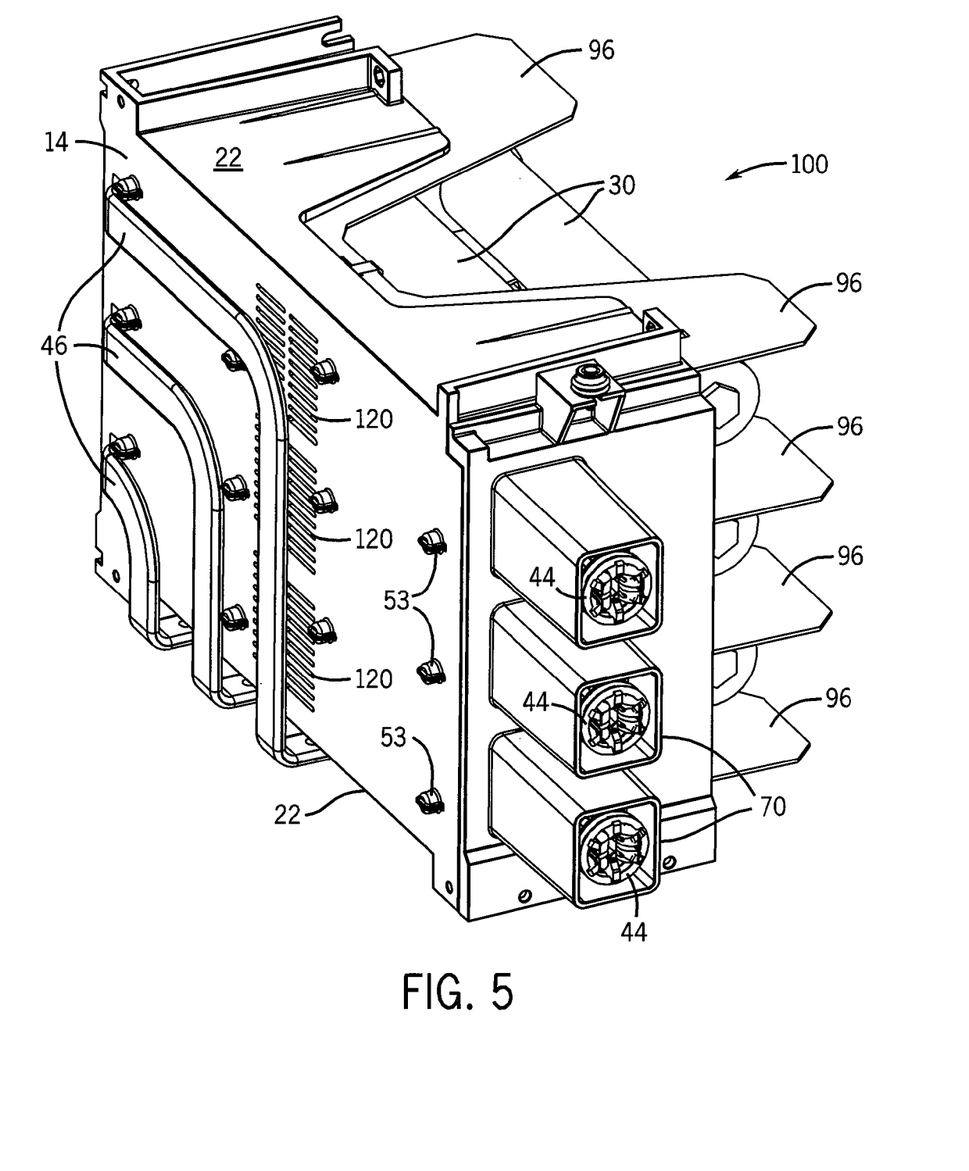
FIG. 5 is a rear perspective view of the housing of FIG. 1 showing bus bar connections between the fuses and associated electrical components.
Figure 6:
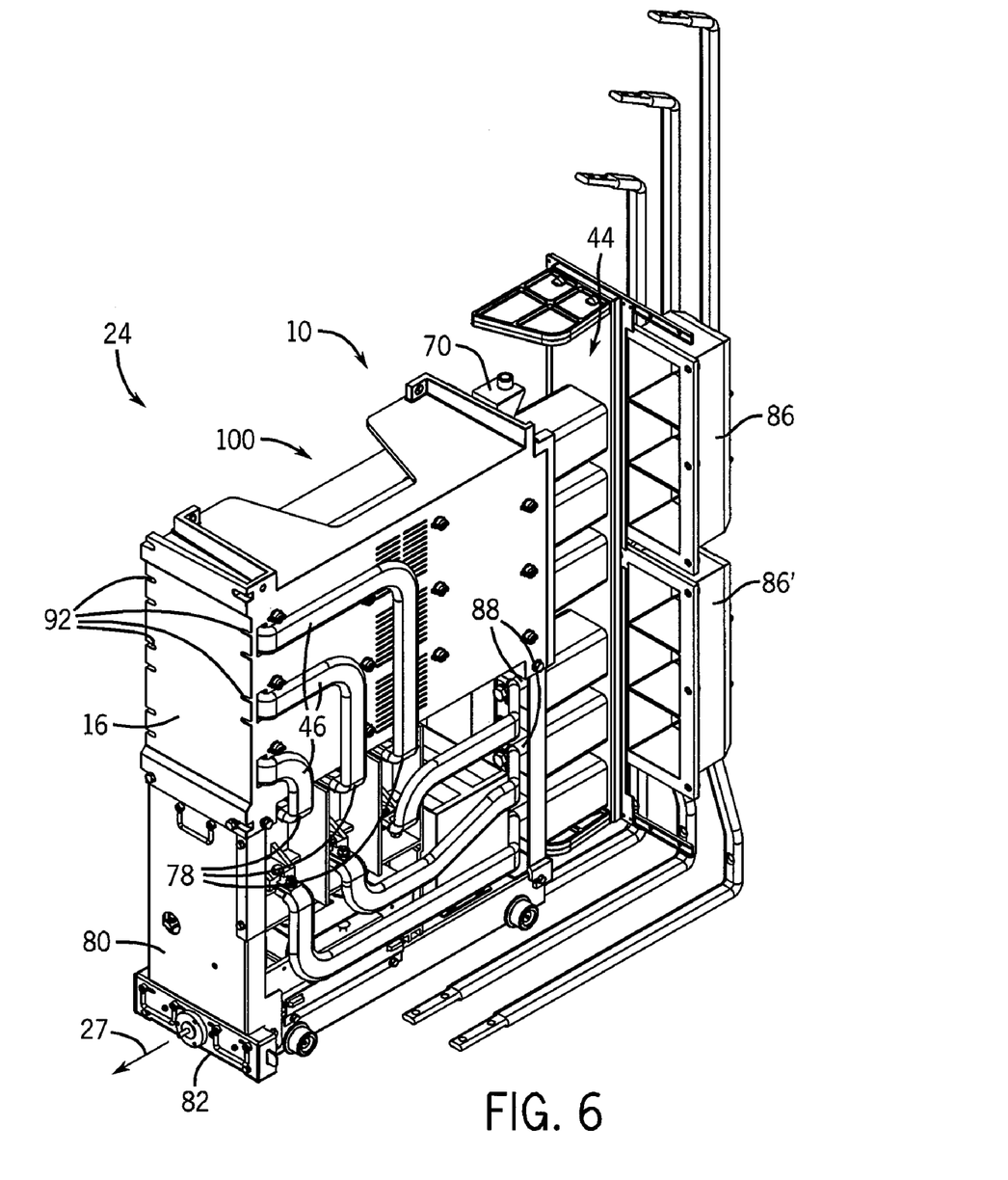
FIG. 6 is a simplified representation of the housing of the present invention incorporated into an equipment drawer.

Referring now to FIGS. 5, 4, and 6, the adapter bus bars 32b may be connected to first ends 77 of the bus bars 46 by two bolts and 42 pass through the flange 38. These bus bars 46 are preformed to pass through the base 14 after connection with the adapter bus bar 32b, as covered with insulated sleeves 47, and then to curve 90° to pass along the outside of the base 14 generally along the axes 27 and curve by 90° along the plane of the base 14 to side wall 22, curving upward along the side wall 22 to terminate at second ends 78 that may be received by the terminals of an adjacent contactor 80.

Referring still to FIG. 6, in this configuration the modular fuse carrier 10 and contactor 80 may be installed on a carriage 82 that provides a sliding drawer mechanism allowing the assembly of the modular fuse carrier 10 and contactor 80 to be withdrawn along an axis 27 generally aligned with the rows of the fuses so that the front face 24 of the modular fuse carrier 10 may be accessible for removal or installation of fuses 30. The carriage 82 provides mounting rails (not shown) that may attach to aligned walls of the contactor 80 and the housing 12 and, in particular, which may use mounting points 97 on an end wall 16 of the housing 12.

Electrical connections between the modular fuse carrier 10 and other equipment (not shown) within an equipment cabinet holding the carriage 82 may be realized through the connectors 44 of the modular fuse carrier 10 connecting with corresponding connectors 86 attached to an internal wall of the equipment cabinet. Similar connectors 88 may be provided on the carriage 82 for the contactor 80 which may mate with corresponding connectors 86' also attached to the internal wall of the equipment cabinet.

The present invention, by providing a standard form factor for a range of different fuses 30, 30', allows the wiring between various elements (for example the contactor 80) to be realized with bus bars 46 that are shaped using equipment not readily accessible in the field.

Referring now to FIGS. 2 and 6, as noted, the end wall 16 provides mounting points 92 which are symmetrically opposed about a plane bisecting the end walls 16 and parallel to the base 14 to allow the modular fuse carrier 10 to be rotated 180° about an axis parallel to axes 27 to provide a system that is accessible from the left side rather than the right side.

Referring now to FIGS. 2 and 5, the present invention also contemplates the provision of replaceable interphase barriers 96 that may serve as the divider walls 26 (previously described) or that may be slid in place next to divider walls 26 by means of channels 98 on interposed end walls 16 and 18 as shown in FIG. 2. These interphase barriers 96 increase the height of the divider walls 26 when three ganged fuses 30 are used. The interphase barriers may be retained by spring clip 106.

Each of the divider walls 26, sidewalls 20 and 22, and interphase barriers 96 include a central notch aperture 100 exposing a mid-portion of the fuses 30 or 30' to allow unobstructed airflow vertically through these apertures 100 where electrical arc protection is not required. These apertures 100 aligned with vents 102 cut in the base 14 extending along a column between the adapter bus bars 32a and 32b so as not to be obstructed thereby.

The housing 12 and interphase barriers 96 may be made of fiber reinforced plastics such as a glass filled polymer (e.g. Glastic). The housing 12 may be molded as a single piece using injection molding or as separate pieces molded and assembled, for example, with the base 14 and walls 16 and sidewalls 20 and 22 integrally molded and the end wall 18 with the shrouds 70 molded separately and epoxy bonded thereto.

It is specifically intended that the present invention not be limited to the embodiments and illustrations contained herein, but include modified forms of those embodiments including portions of the embodiments and combinations of elements of different embodiments as come within the scope of the following claims.

I claim:

1. A modular fuse carrier comprising:
an electrically insulating housing providing a generally rectangular base having upstanding sidewalls and end walls defining, together with the base, a housing volume accessible through an open face opposite the base, and having interior divider walls parallel to the sidewalls;
a set of six adapter bus bars mounted to the base and arranged in three rows separated by the divider walls and arranged along axes between end walls and in two columns arranged along axes between sidewalls, the adapter bus bars electrically separated with individual bus bars of each row positioned adjacent to opposite end walls of the housing, wherein outward, exposed surfaces of corresponding pairs of the adapter bus bars of each row extend along the row by an amount sufficient for the pairs to be to be spanned by a range of electrical cartridge fuses for amperages between approximately 10 and 800 amperes having different lengths corresponding to different current thresholds, each adapter bus bar providing multiple mounting points corresponding to each of different electrical cartridge fuses of the range;
wherein the adapter bus bars of one column have connections adjacent an end wall to power connectors extending through the end wall and adapter bus bars of the other column have connections each to one of a set of three bus bars extending through the housing to an external connection point;
whereby multiple fuse types may be readily incorporated into a standard assembly.

2. The modular fuse carrier of claim 1 wherein the current thresholds of fuses range between at least 100 amps to 800 amps.

3. The modular fuse carrier of claim 2 wherein the mounting points provide for an attachment of each of DIN-type, ANSI-type fuse, and British Standard type fuse brackets.

4. The modular fuse carrier of claim 1 wherein the adapter bus bars are plates and the mounting points are internally threaded holes open at the surface of the plates.

5. The modular fuse carrier of claim 4 wherein the mounting points receive fuse brackets selected from the group consisting of single fuse L-brackets, double fuse L-brackets, triple fuse L-brackets, and spring clips.

6. The modular fuse carrier of claim 1 wherein the three bus bars extend to points proximate to an outside of one side wall for attachment to a contact or having a base wall coplanar with the base of the modular fuse carrier.

7. The modular fuse carrier of claim 1 further including a set of removable insulating barrier plates sized to fit between the rows and wherein the end walls further include retaining elements releasably retaining the insulating barrier plates for ganged fuse configurations.

8. The modular fuse carrier of claim 7 wherein the end walls provide supports for four insulating barrier plates between each row and between a top and bottom row and a corresponding sidewall.

9. The modular fuse carrier of claim 7 wherein the insulating barrier plates provide central apertures allowing air flow through the fuses at a middle of the fuses while providing barriers at electrically conductive end portions of the fuses.

10. The modular fuse carrier of claim 9 wherein in the sidewalls and divider walls have corresponding apertures.

11. The modular fuse carrier of claim 9 wherein further including air vents passing through the base extending along the columns and aligned with the apertures in the sidewalls.

12. The modular fuse carrier of claim 1 wherein the power connectors are oriented to mate along axes parallel to and aligned with the rows.

13. The modular fuse carrier of claim 12 wherein one end wall includes integrally molded insulating tubes receiving and surrounding power connectors attached to adapter bus bars.

14. The modular fuse carrier of claim 1 wherein the housing provides symmetrical mounting points on an end wall about a plane bisecting the end wall and parallel to the base.

15. The modular fuse carrier of claim 1 wherein the adapter bus bars are held by bolts received by threaded inserts in the insulating base.

16. The modular fuse carrier of claim 1 wherein the power connectors are selected from the group consisting of tulip-style, bullet-style, and finger-style connectors.

17. A modular fuse carrier kit comprising:
an electrically insulating housing providing a generally rectangular base having upstanding sidewalls and end walls defining, together with the base, a housing volume accessible through an open face opposite the base, and having interior divider walls parallel to the sidewalls;
a set of six adapter bus bars mounted to the base and arranged in three rows separated by the divider walls and arranged along axes between end walls and in two columns arranged along axes between sidewalls, the adapter bus bars electrically separated with individual bus bars of each row positioned adjacent to opposite end walls of the housing, wherein outward, exposed surfaces of corresponding pairs of the adapter bus bars of each row extend along the row by an amount sufficient for the pairs to be to be spanned by a range of electrical cartridge fuses for voltages substantially between 2.42 and 7.2 kV having different lengths corresponding to different current thresholds, each adapter bus bar providing multiple mounting points corresponding to each of different electrical cartridge fuses of the range;
wherein the adapter bus bars of one column have connections adjacent an end wall to power connectors extending through an end wall and adapter bus bars of the other column have connections each to one of a set of three bus bars extending through the housing to an external connection point;
a set of fuse brackets receivable by the mounting points and selected from the group consisting of single barrel L-brackets, double barrel L-brackets, triple barrel L-brackets, and spring clips.

18. A modular fuse carrier comprising:
an electrically insulating housing providing standard mounting points on the housing, the housing sized to receive at least one cartridge fuse of a type suitable for currents greater than 10 amperes;
interface electrical conductors attached to the insulating housing to provide for predetermined electrical connection locations on the housing; and
a set of at least two electrical adapters attached to the housing and having fuse attachment points providing electrical connections to ends of a cartridge fuse held within the housing, the fuse attachment points adjustable in separation and type to accommodate fuses of different sizes and types within the electrically insulating housing, the electrical adapters further communicating with the interface electrical conductors;
whereby the housing may be incorporated into electrical equipment and electrically connected to the equipment via the interface electrical conductors before determination of a fuse type to be used with the housing.

19. The modular fuse carrier of claim 18 wherein the electrical connections are selected from the group consisting of bus bars and pluggable connectors.

20. The modular fuse carrier of claim 18 wherein the fuse attachment points are adapted in type to connect with fuses selected from the group consisting of: DIN-type, ANSI-type, and British Standard types.

* * * * *